(12) United States Patent
Lesieur

(10) Patent No.: US 6,620,389 B1
(45) Date of Patent: Sep. 16, 2003

(54) FUEL GAS REFORMER ASSEMBLAGE

(75) Inventor: Roger R. Lesieur, Enfield, CT (US)

(73) Assignee: UTC Fuel Cells, LLC, Windsor, CT (US)

( * ) Notice: Subject to any disclaimer, the term of this patent is extended or adjusted under 35 U.S.C. 154(b) by 456 days.

(21) Appl. No.: 09/598,205

(22) Filed: Jun. 21, 2000

(51) Int. Cl.[7] .............................. B01J 8/02; B01F 3/00; B01F 3/02; B01F 5/06; B01F 15/02
(52) U.S. Cl. ...................... 422/220; 422/194; 422/211; 422/224; 48/127.9; 48/180.1; 48/198.8
(58) Field of Search .................... 422/189, 190–197, 422/176, 177, 181, 183, 211, 220, 310, 224; 566/165.1, 165.2, 340; 137/888, 14; 366/163.1, 181.5, 173.1, 174.1; 48/127.9, 180.1, 189.4, 198.7, 198.8, 197 R

(56) References Cited

U.S. PATENT DOCUMENTS

| | | | | |
|---|---|---|---|---|
| 3,598,541 A | * | 8/1971 | Hennemuth et al. | 422/191 |
| 4,140,625 A | | 2/1979 | Jensen | 208/146 |
| 4,255,410 A | | 3/1981 | Spevack | 423/659 |
| 4,706,751 A | * | 11/1987 | Gondouin | 166/401 |
| 5,131,757 A | * | 7/1992 | Smith | 366/165.5 |
| 5,462,719 A | * | 10/1995 | Pedersen et al. | 422/195 |

* cited by examiner

Primary Examiner—Jerry D. Johnson
Assistant Examiner—Alexa A. Doroshenk
(74) Attorney, Agent, or Firm—William W. Jones

(57) ABSTRACT

A fuel gas-steam reformer assembly, preferably an autothermal reformer assembly, for use in a fuel cell power plant, includes a mixing station for intermixing a relatively high molecular weight fuel and an air-steam stream so as to form a homogeneous fuel-air-steam mixture for admission into a catalyst bed. The catalyst bed can include catalyzed alumina pellets, or a monolith such as a foam or honeycomb body which is preferably formed from a high temperature material such as a steel alloy, or from a ceramic material. The air-steam stream is fed into a manifold in the mixing station. The mixing station also comprises a plurality of tubes which open into the catalyst bed, and which pass through the manifold. The tubes extend through the manifold and include tangential openings which interconnect the interior of the tubes with the manifold. The openings have axes which are tangential to the circumference of each of the tubes. There is a first set of openings which are tangential to the tubes in one direction, and a second set of openings which are tangential to the tubes in the opposite direction. The first set of openings create a swirling mixture of the fuel, air and steam inside of the tubes, and the second set of openings creates a counter force which nulls the swirling mixture and results in an intimate admixture of fuel, air and steam in a stream with reduced swirling in the tubes prior to entry of the fuel, air and steam stream into the catalyst bed. The fuel is a fuel which preferably has a higher molecular weight than ethane or methane. The fuel may also include a small amount of steam admixed therewith prior to entry into the mixing tubes.

14 Claims, 4 Drawing Sheets

FUEL GAS REFORMER ASSEMBLAGE

TECHNICAL FIELD

This invention relates to a fuel gas steam reformer assemblage for reforming heavier hydrocarbon fuels such as methane, methanol or ethanol, but especially heavier fuels such as propane, butane, gasoline and diesel fuel, and converting them to a hydrogen-rich fuel stream suitable for use in a fuel cell power plant. More particularly, this invention relates to an autotheormal fuel gas steam reformer assemblage which employs a pre-catalyst bed mixing apparatus that provides an essentially uniform fuel/steam/air mixture, wherein at least 90% of the fuel, steam, and air are thoroughly admixed, for introduction into the catalyst bed in the reformer. The steam reformer assemblage of this invention is suitable for use in mobile applications.

BACKGROUND OF THE INVENTION

Fuel cell power plants include fuel gas steam reformers which are operable to catalytically convert a fuel gas, such as natural gas or heavier hydrocarbons, into the primary constituents of hydrogen and carbon dioxide. The conversion involves passing a mixture of the fuel gas and steam, and, in, certain applications air/oxygen and steam, through a catalytic bed which is heated to a reforming temperature that varies, depending upon the fuel being reformed. A catalyst typically used is a nickel catalyst which is deposited on alumina pellets. Of the three types of reformers most commonly used for providing a hydrogenrich gas stream to fuel cell power plants, tubular thermal steam reformers, autothermal reformers, and catalyzed wall reformers, the autothermal reformer has a need for rapid mixing capabilities in order to thoroughly mix the fuel-steam and air prior to entrance into the reformer catalyst bed. U.S. Pat. No. 4,451,578, granted May 29, 1984 contains a discussion of autothermal reforming assemblages, and is incorporated-herein in its entirety. The autothermal reformer assembly described in the '578 patent utilizes catalyzed alumina pellets. In the design of auto-thermal reformers for hydrogen-fueled fuel cell systems, thereis a need for rapid and thorough mixing of the reactants (air,. steam and fuel) prior to entry of the reactants into the catalyst bed. The autotherrmal reformers require a mixture of steam, fuel and air in order to operate properly. These reformers are desirable for use in mobile applications, such as in vehicles which are powered by electricity generated by a fuel cell power plant. The reason for this is that autothermal reformers can be compact, simple in design, and are better suited for operation with a fuel such as gasoline or diesel fuel. One requirement for a fuel processing system that is suitable for use in mobile applications is that the system should be as compact as possible, thus, the mixing of the steam, fuel and air constituents should be accomplished in as as compact an envelope as possible. Once the constituents are mixed, the residence time in the mixer must be limited to prevent carbon deposition. The problem encountered with such a compact assemblage is how to achieve the thorough degree of mixing needed in the autothermal reformer in as short a time and distance as possible with oxygen to carbon ratios as low as 0.30 to 0.35 for hydrocarbon fuels, and as low as 0.14 to 0.20 for methanol and ethanol fuels.

DISCLOSURE OF THE INVENTION

This invention relates to a compact autothermal reformer assemblage which is operable to reform relatively heavy hydrocarbon fuels such as propane, butane, gasoline, diesel. fuel, JP-4, JP-5 and JP-8, for example. In the reformer assemblage of this invention, air and steam are mixed in a premixing section prior to entering the auto-thermal reformer section of the assemblage. The reformer section includes a fuel, steam and air mixing station and the reforming catalyst bed. The catalyst bed care be a two stage bed, the first stage being, for example, an iron oxide catalyst stage, and the second stage being, for example, a nickel catalyst stage. The second stage could contain other catalysts, such as noble metal catalysts including rhodium, platinum, palladium, or a mixture of these catalysts. Alternatively, the catalyst bed could be a single stage bed with a noble metal catalyst, preferably rhodium, or a mixed rhodium/platinum catalyst.

The fuel is fed into the mixing station either alone or with some steam for improved vaporization, and an air/steam mixture (the oxidizer) is introduced into the mixing station. To minimize the mixing section length, the fuel-steam-air mixture must form rapidly and thoroughly. Minimizing mixing section length reduces the size of the assemblage, which is an important consideration for automotive applications. Minimizing the mixing section also reduces the residence time of the fuel, steam and air mixture in the mixer, thereby minimizing the risk of auto-ignition and of carbon formation prior to the mixture's entering the catalyst bed.

The autothermal reformer assemblage of this invention is preferably, but not necessarily cylindrical or oval in shape and, as noted above, is associated with an air-steam premixing station. A stream of a relatively heavy hydrocarbon fuel, such as gasoline, diesel fuel, or JP fuel, with or without steam, is fed into one or more mixing tubes which form a part of the mixer station. The mixing tubes pass through a manifold which receives a steam/oxidant mixture. The oxidant is typically air. The fuel stream passes axially through the mixing tube(s), and the air/steam mixture enters the tube(s) from the air/steam manifold through sets of tangential openings formed in the tube(s). The mixing tube openings will include at least two sets of openings one of which will induce a clockwise air/steam/fuel swirl in the mixture flowing through the mixing tubes, and the other of which will induce a counter clockwise air/steam/fuel swirl in the mixture flowing through the mixing tubes. The counteracting mixture swirls result in a thorough mixing of the air/steam and fuel components which can be achieved relatively quickly and in a relatively compact envelope. The air/steam stream swirls the fuel stream first in one direction and then in the opposite direction, thus resulting in an essentially homogeneous fuel-steam-air mixture by the time that the mixture exits from the mixing tubes and enters into the catalyst bed.

The use of tangential mixing tube openings causes an initial intense mixing by creating a very high shear between the reactant streams and forces the heavier fuel stream to mix by accelerating it through the lighter air/steam stream. A counter swirl results in increased mixing by creating instabilities in the flow stream without the inclusion of baffles in the mixing tubes, which would tend to become fouled with carbonaceous deposits from the fuel. The high speed mixing action achieved in the assembly also eliminates fuel fouling of the mixing tube walls by minimizing fuel contact with the mixing tube walls.

Rapid mixing is required to prevent carbon formation because soon after air is added to the fuel stream, the gas mixture temperature starts to rise and the fuel wants to crack to form carbon. This carbon formation eventually plugs the reactor and prevents flow through the reactor. It is necessary to mix rapidly and get the fully mixed fuel/steam/air mixture to the catalyst to reform catalytically to hydrogen rather than react homogeneously and form carbon. As the mixer residence time increases, the amount of oxygen required to prevent carbon in the autothermal reformer increases significantly, In order to prevent carbon formation in the catalyst bed itself, the gases must be fully mixed before contacting the catalyst, and one way to accomplish this result is by the generation of a swirling gas flow in the mixing tubes. The inclusion of an oppositely swirling enhances mixing as well as negating the swirl, thus providing a relatively uniform gas flow stream entering the catalyst bed. This minimizes disruption of the catalyst bed particles by the gas mixture as the latter flows into the catalyst bed. In order to produce maximum mixing of the two gas streams, it is desirable to design a mixer that will produce an air/steam,gas stream velocity which is at least three times the velocity of the fuel gas stream flowing through the mixing tubes. The degree of circumferential penetration of the tangential jets into the axial fuel flow stream can be controlled by the ratio of the kinetic energies of the tangentially flowing jet streams to the axially flowing fuel gas stream. If a single row of jets is used, then the penetration distance can be such that the jet swirls around the mixer tube several times; however, if two counter jets are used as described herein, then the first set of jets should be designed such that the swirling penetration from the first set of jets does not continue past the second set of jets.

It is therefore an object of this invention to provide an air/steam/fuel mixing method and system which achieves satisfactory mixing of two different composition streams in a relatively short period of time so as to minimize carbon deposition in the mixing system.

It is a further object of this invention to provide a method and system of the character described wherein one of the streams is swirled into the other of the streams in mixing tubes.

It is yet another object of this invention to provide a method and system of the character described wherein the air/steam/fuel mixture leaves the mixing tubes with minimal or no internal swirl.

These and other objects and advantages of the invention will be more readily understood from the following detailed description of a specific embodiment of the invention when taken in conjunction with the accompanying drawings, in which:

DETAILED DESCRIPTION OF THE INVENTION

Figure 1:
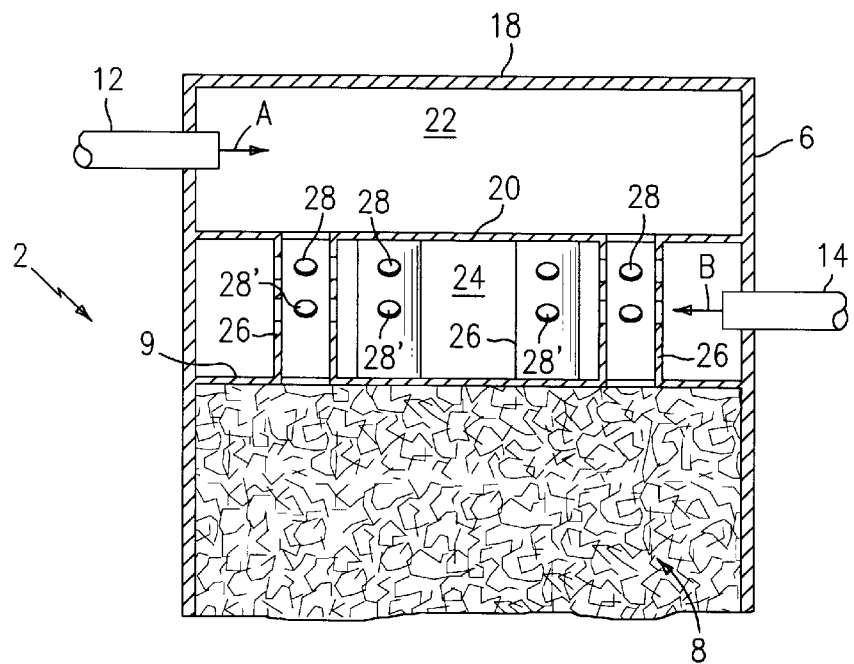
FIG. 1 is fragmented cross sectional view of an air/steam/fuel mixing assembly formed in accordance with this invention.

Referring now to FIG. 1, one proposed embodiment of a mixing chamber which is suitable for providing a fuel/steam/air mixture for use in an autothermal reformer assemblage. The reformer assemblage 2 can be cylindrical, oval or some other curvilinear cross sectional shape. A reforming catalyst bed 8 is disposed in the shell 6 below a first transverse wall 9. The tube 12 carries a vaporized fuel reactant, and the tube 14 carries an oxidant/steam reactant, which oxidant is usually air. The vaporized fuel may also include some steam which assists in vaporizing the fuel. If so desired, the contents of the tubes 12 and 14 could be reversed. A top wall 18 closes the upper end of the inner cylindrical shell 6, and an intermediate wall 20 divides the upper end of the shell 6 into an upper manifold 22 and a lower manifold 24. The lower manifold 24 is separated from the catalyst bed 8 by a wall 9. The tube 12 opens into the upper manifold 22 and the tube 14 opens into the lower manifold 24. Thus the vaporized fuel is fed into the upper manifold 22, and the air/steam mixture is fed into the lower manifold 24. A plurality of mixing tubes 26 extend between the upper manifold 22 to the catalyst bed 8 through the wall 9. The mixing tubes 26 interconnect the fuel manifold 22 with the catalyst bed 8. The mixing tubes 26 include two sets of tangential openings 28 and 28' which open into the air manifold 24. The first set of openings 28 will result in a clockwise swirl of air and steam being injected into the mixing tubes 26, and the second set of openings 28' will result in a counter clockwise swirl of air and steam being injected into the mixing tubes 26. The clockwise swirl will result in a highly turbulent mixing of the fuel, air and steam, and the counter clockwise swirl will result in further mixing with a nulling out of the swirl in the mixing tubes 26. Thus the air/steam/fuel mixture will enter the catalyst bed 8 with very little, if any, internal swirl. This results in very little disturbance of the catalyst by the entering mixture.

The assemblage 2 operates generally as follows. The vaporized fuel mixture enters the manifold 22 per arrow A and flows out of the manifold 22 to the catalyst bed 8 through the mixing tubes 26. Air and steam enter the manifold 24 per arrow B and enters the mixing tubes 26 through the tangential openings 28 and 28'. The mixing of the fuel steam and air occurs in the mixing tubes 26 downstream of the openings 28 and 28' as described in detail hereinafter.

Figure 2:
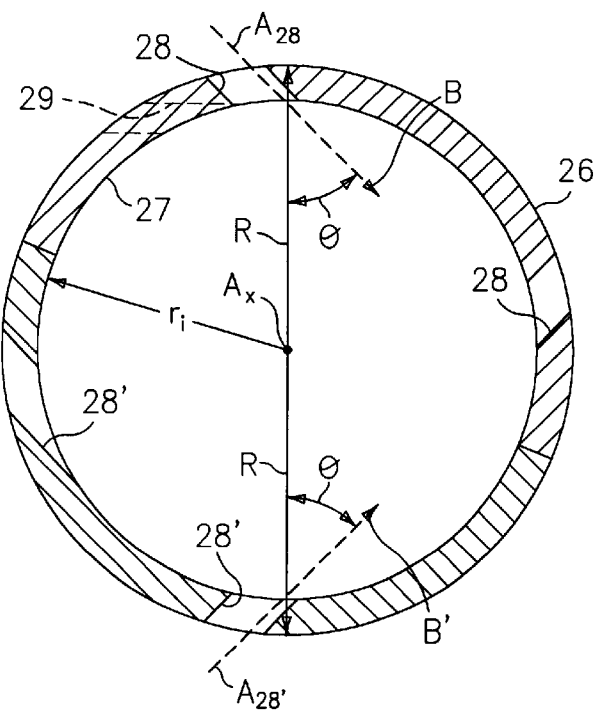
FIG. 2 is a split cross sectional view of one of the mixing tubes showing how the axes of a first set of mixing holes is skewed at an angle to the radius of the mixing tube in one direction, and how the axes of a second set of mixing holes is skewed at an angle to the radius of the mixing tube in the opposite direction.

Referring now to FIG. 2, details of the mixing tubes 26 and the concept of sets of tangential or chordal mixing openings 28 and 28' are shown. The axis of the tube bore 27 is denoted by Ax. It will be noted that the axes of the sets of openings 28 and 28' are tangential or chordal to the tube 26. The fuel flows through the tubes 26 in the axial direction and the air/steam mixture flows into the tubes 26 along the paths generally defined by the arrows B and B'. The radius of the bore 27 is denoted by the symbol $r_i$. It will be noted that the air flow vectors $A_{28}$ of the first set of openings 28 and the air flow vectors $A_{28'}$ of the second set of openings 28' are skewed in opposite directions with respect to the tube 26 by an included angle Ø which is taken at the intersection of the radius R and the air flow vectors $A_{28}$ and $A_{28'}$. It will be noted that these vectors are parallel to the axes of the openings 28 and 28'. The skew of the first set of openings 28 causes the injected air/steam stream to enter the fuel stream along a first path which is denoted by the arrow B that will impose a clockwise swirling force on the axially flowing fuel stream. The opposite skew of the second set of openings 28' imposes an opposite counter clockwise swirling force on the fuel stream, per arrow B'. The two oppositely swirling forces negate each other after the second set of openings 28'. The two oppositely directed swirling forces imposed on the axially flowing fuel stream create a great deal of turbulence in the fuel stream over a short distance in the mixing tubes 26, but which results in a very thorough mixing of the air, steam and fuel, and also creates a non-swirling stream of the three reactants entering the catalyst bed. By varying the angle Ø slightly off the tangent, mixing can take place around the entire circumference of the incoming jets, until they impinge the wall of the tube bore 27. The angle Ø should preferably be in the range of about 65° to about 90°. In general, the larger the angle Ø, up to a maximum of 90°, the more efficient the mixing of air and fuel; and the amounts of air needed to achieve the desired result are lower with larger Ø angles. Air is necessary to retard carbon deposition in the catalyst bed 8, but air also produces combustion of the fuel being processed. The opening 29, shown in phantom in FIG. 2, is disposed at a 90° entry angle. By enabling the use of smaller amounts of air to produce the required fuel/air mixture, the amount of hydrogen which is consumed during the autothermal reforming process is reduced.

Figure 3:
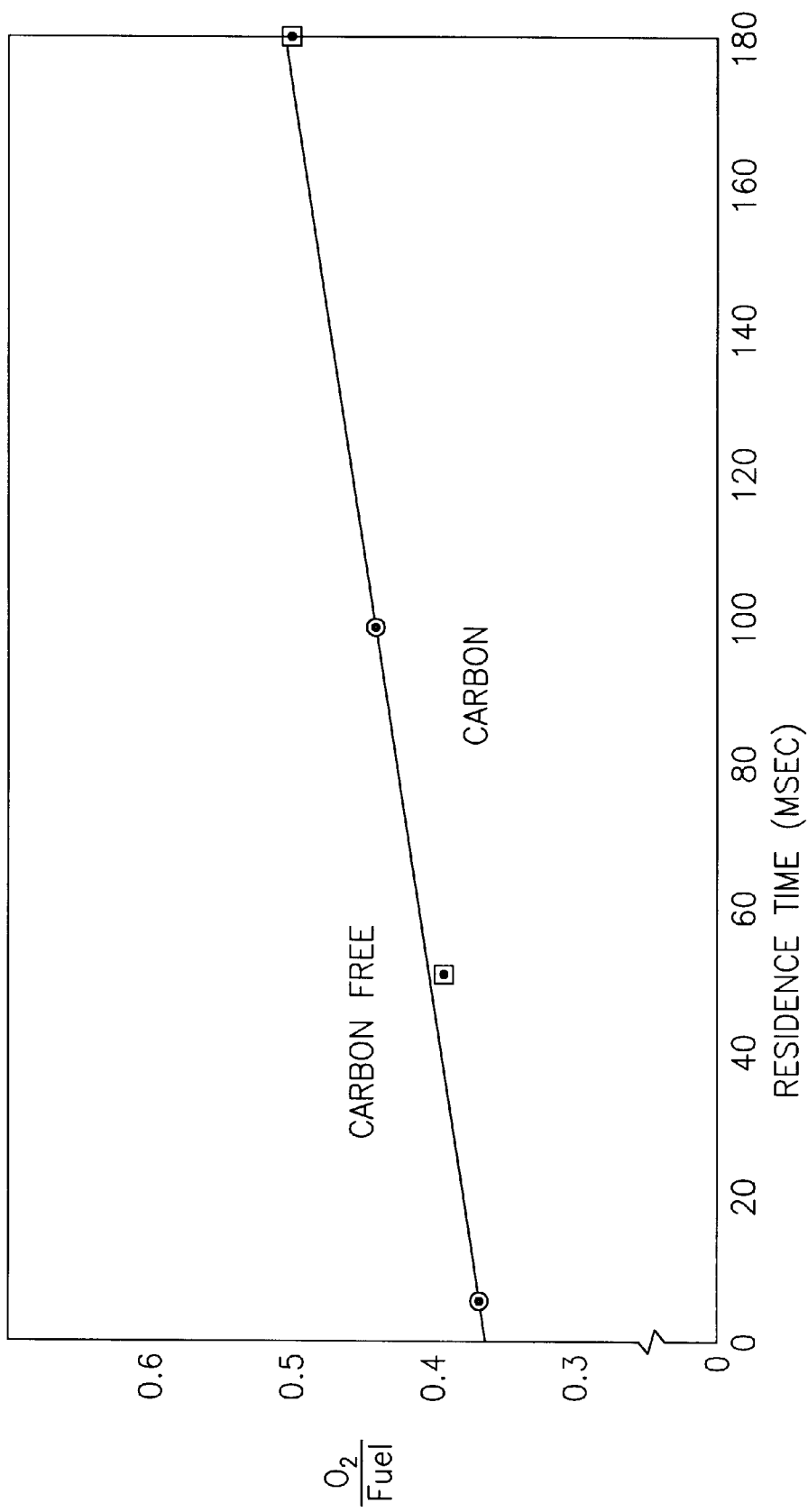
FIG. 3 is a graphic representation of the amount of air required (air-to-fuel ratio) to prevent carbon deposition in the catalyst bed plotted against the residence time of the air/fuel mixture in the mixing tube.

FIG. 3 is a graphic representation showing the relationship between the proportion of air in the air/fuel mixture to prevent carbon formation and the dwell lime of the air/fuel mixture in the mixer tubes. It will be noted from FIG. 3 that the longer the dwell time, the greater the amount of air needed in the mixture in order to retard carbon deposition in the mixer. FIG. 3 demonstrates that with shorter dwell times, lesser amounts of air (oxygen) are needed to produce the desired air/fuel mixture, while eliminating carbon deposition.

Figure 4:
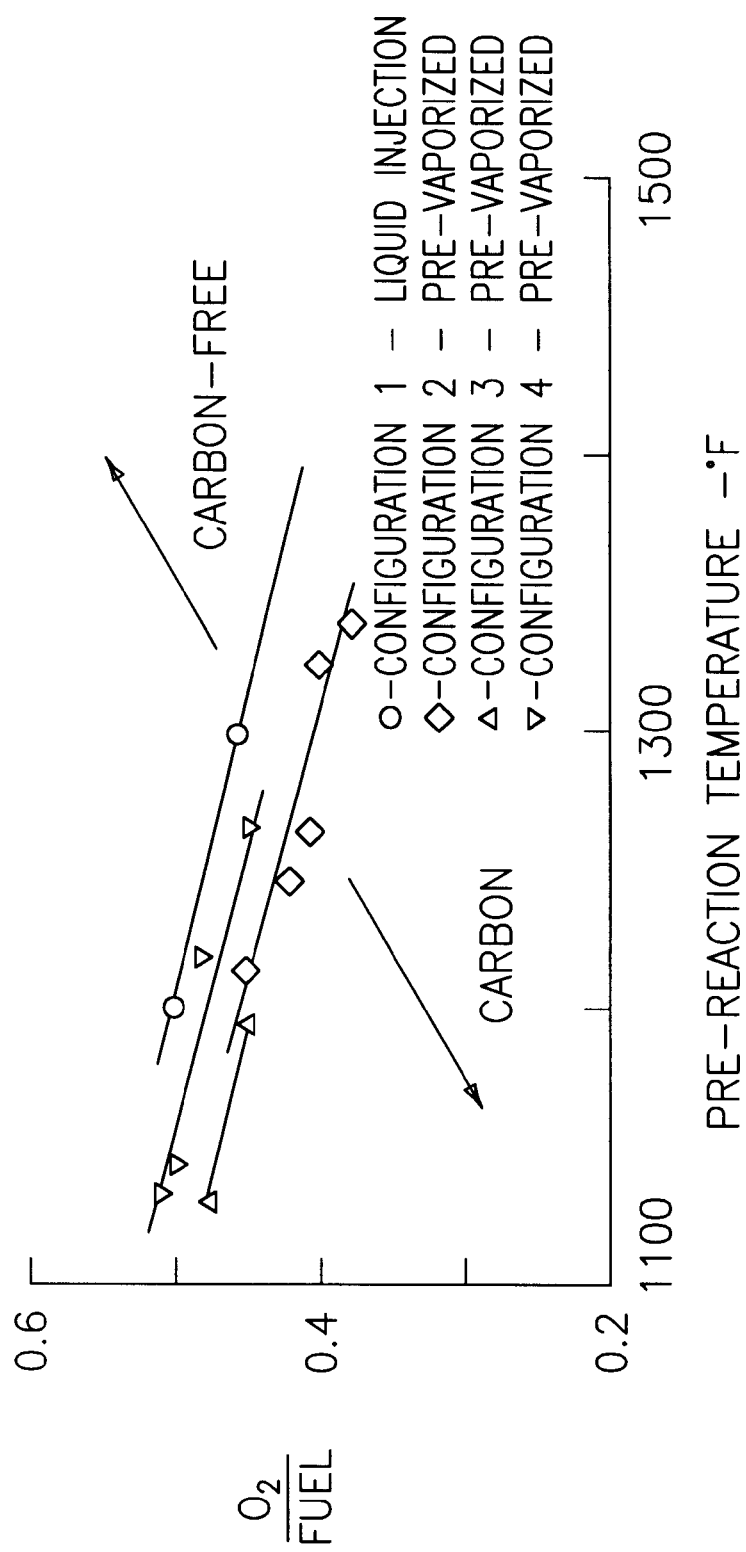
FIG. 4 shows the effect of mixer geometry on the amount of oxygen required to minimize carbon deposition during an autothermal reformer test of No. 2 fuel oil, steam and air.

Referring now to FIG. 4, there are shown the results of four different injection nozzle configurations, configuration 1, configuration 2, configuration 3 and configuration 4, with different entry or skew angles 0, the same diameter oxygen injection openings, and different fuel injection states. In configuration 1, the angle Ø was 90°, the injection openings had a diameter of 0.104 inch, and the fuel being used was in a liquid state; in configuration 2, the angle Ø was 90°, the injection openings had a diameter of 0.104 inch, and the fuel being used was in a vaporous state; in configuration 3, the angle Ø was 65°, the injection openings had a diameter of 0.104 inch, and the fuel being used was in a vaporous state; and in configuration 4, the angle Ø was 45°, the injection openings had a diameter of 0.104 inch, and the fuel being used was in a vaporous state. This plot shows the relationship between the pre-reaction fuel and air temperature and the ratio of air ($O_2$)-to-fuel required to prevent carbon deposition with the different injection nozzle configurations. It will be noted that configurations 2 and 3 produced the lowest air to fuel ratio at all pre-reaction temperatures and thus the most desirable suppression of carbon deposits. It is very important to minimize the amount of oxygen added to the fuel stream in order to minimize the amount of hydrogen consumed during the reforming process. In FIG. 4 several nozzle configurations and operating conditions were evaluated so that optimum operating conditions and nozzle configurations could be evaluated. The "pre-reaction temperature" is the temperature of the mixed reactants prior to their entering the catalyst bed. The fuel used in configuration 1 was in a liquid form, and the fuel used in configurations 2, 3 and 4 was in a vapor form. The results disclosed in FIG. 4 indicate that the use of a liquid fuel would not be preferred in the performance of this invention due to incomplete vaporization of the fuel and incomplete mixing of the air, steam and fuel. Operating in an air-to-fuel ratio below the lines denoting configurations 1, 2, 3 and 4 results in carbon formation in the catalyst bed 8 and: does not result in acceptable operating conditions. The four lines shown in FIG. 4 were generated by lowering the air input to the reactor until carbon started to form, as evidenced by a pressure drop increase across the catalyst bed. Air flow was then increased until it was observed that the pressure drop started to decrease. The point at which the pressure drop decreases is defined as the carbon boundary. Thus the traces show carbon-no carbon boundaries for the four different configurations. As noted above, this procedure was performed for several configurations. Configuration 4 uses injection openings which are disposed at an entry angle Ø of 45°. Configuration 2 uses injection openings which are disposed at an entry angle Ø of 90°. Configuration 3 uses injection openings which are disposed at an entry angle Ø of 65°. Very little difference is observed: between the two configurations wherein the entry angle Ø=65° and wherein Ø=90°. However, a decline in performance is suggested when the injection angle 0 falls below about 45°.

It is apparent that when the fuel/steam/air stream is not thoroughly mixed, an undesirably high concentration of oxygen is required to prevent carbon formation in the system. All of the above tests were run using a high sulfur content fuel oil. The test results, which are documented in FIG. 4, indicate that it is preferred to use a liquid fuel which has been pre-vaporized, and to employ swirl-inducing injection angles 0 which are in the range of about 45° to about 90°.

Figure 5:
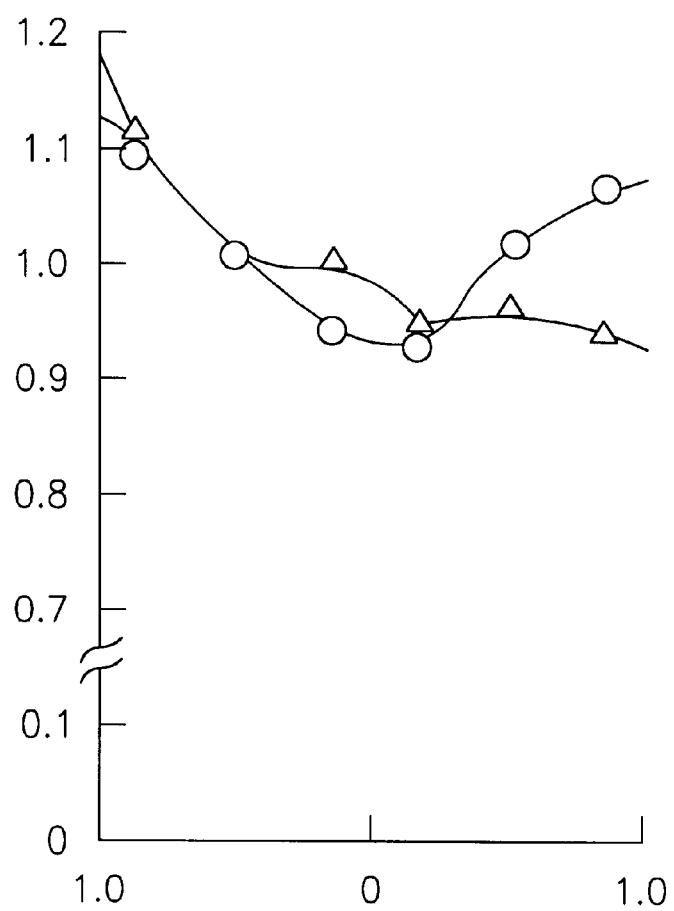
FIG. 5 is a graphic depiction of gas chromatic analyses of a simulated air/fuel/steam gas mixture taken from mutually perpendicular angles as the mixture flows through the mixing chamber so as to determine the effectiveness of the invention in enhancing the mixing of the separate air and fuel/steam streams to produce an intimate mixture. thereof, wherein the simulated mixture included $CO_2$ instead of a vaporized fuel, and an air/oxygen reactant.

Referring now to FIG. 5, there is shown two mutually perpendicular gas chromatograph analyses of the two reactant gas streams, one being $CO_2$ which was used to simulate a vaporized fuel, and the other being air or oxygen, as they exit the mixing tubes. The results observed in this analysis are helpful in determining whether the reactant streams are following each other through the mixing chamber and are being intimately mixed with each other. In FIG. 5, the X axis is the relative radius $r/R_0$ at which gas chromatic readings were taken, and the Y axis denotes the average concentration of $CO_2$ (fuel) at each point at which chromatic readings were taken.

It will be appreciated that the reformer assemblage and air-fuel-steam mixer component can be made sufficiently compact so as to be useful in a vehicular applications. The reformer is preferably an autothermal reformer so as to be operable with liquid fuels such as gasoline or diesel fuel. The catalyst bed is thus preferably a two stage bed, with the initial stage having an iron oxide or equivalent catalyst, and the second stage having a nickel or equivalent catalyst. The catalyst bed could, however, instead be a single stage bed, with a noble metal rhodium or a rhodium-platinum catalyst being preferred. The fact that there is a unique range of relationships between the skew angle of the air-admitting holes for counter directional swirling injection of the air into the mixing tubes, and the state of the fuel stream, provides a fast and thorough mixing of the fuel-steam and air constituents thereby ensuring: a homogeneous mixture of air, steam and fuel at the entrance of the catalyst bed with minimal swirling.

Since many changes and variations of the disclosed embodiment of the invention may be made without departing from the inventive concept, it is not intended to limit the invention otherwise than as required by the appended claims.

What is claimed is:

1. A mixing station for mixing a source of oxygen with a hydrocarbon fuel stream so as to form an intimate mixture of oxygen and fuel reactants which mixture is suitable for admission into a catalytic steam reformer catalyst bed, said mixing station comprising:
   a) a first manifold for receiving a stream of one of said oxygen or fuel reactants;
   b) a second manifold for receiving a stream of the other of said oxygen or fuel reactants;
   c) at least one reactant mixing tube having an interior bore for receiving an axially flowing stream of one of said reactants from said mixing tube opening into the catalyst bed;
   d) at least two sets of tangential openings interconnecting said first manifold with said mixing tube bore; and
   e) said at least two sets of tangential openings spaced apart from each other axially along said mixing tube, one set of tangential openings being operable to create a clockwise swirling oxygen and fuel reactant mixture in said mixing tube bore, and another set of tangential openings being operable to create a counter-clockwise swirling oxygen and fuel reactant mixture, said clockwise and counter-clockwise swirls being operable to null each other out by the time the oxygen and fuel reactant mixture reaches said catalyst bed.

2. The mixing station of claim 1 wherein said oxygen source includes air.

3. The mixing station of claim 2 wherein said oxygen source includes steam.

4. The mixing station of claim 1 wherein the hydrocarbon fuel stream includes a vaporized fuel with a higher molecular weight than ethane or methane.

5. The mixing station of claim 4 wherein the hydrocarbon fuel stream includes steam.

6. The mixing station of claim 1 wherein said tangential opening enters said mixing tube bore at an included angle Ø which is in the range of about 45° to about 90°.

7. The mixing station of claim 1 wherein said tangental opening enters said mixing tube bore at an included angle Ø which is in the range of about 60° to about 90°.

8. A method for mixing a source of oxygen with a hydrocarbon fuel stream so as to form an intimate mixture of oxygen and fuel reactants which mixture is suitable for admission into a catalytic steam reformer catalyst bed, said mixing station comprising:
   a) providing a first manifold for receiving a stream of one of said oxygen or fuel reactants;
   b) providing a second manifold for receiving a stream of the other of said oxygen or fuel reactants;
   c) providing at least one reactant mixing tube having an interior bore extending from said second manifold through said first manifold, said mixing tube opening into the catalyst bed;
   d) axially injecting one of said reactants into said mixing tube from said second manifold;
   e) tangentially injecting the other of said reactants from said first manifold through a tangential opening in said mixing tube so as to provide a swirling oxygen and fuel reactant mixture in the mixing tube bore; and
   f) wherein said tangentially injection step is performed through two sets of tangential openings spaced apart from each other axially along said mixing tube, one set of tangential openings being operable to create a clockwise swirling oxygen and fuel reactant mixture in said mixing tube bore, and the other set of tangential openings being operable to create a counterclockwise swirling oxygen and fuel reactant mixture, said clockwise and counter-clockwise swirls being operable to null each other out by the time the oxygen and fuel reactant mixture reaches said catalyst bed.

9. The method of claim 8 wherein said oxygen source includes air.

10. The method of claim 9 wherein said oxygen source includes steam.

11. The method of claim 8 wherein the hydrocarbon fuel stream includes a vaporized fuel having a higher molecular weight than ethane or methane.

12. The method of claim 11 wherein the hydrocarbon fuel stream includes steam.

13. The method of claim 8 wherein said tangential opening enters said mixing tube bore at an included angle Ø which is in the range of about 45° to about 90°.

14. The method of claim 8 wherein said tangential opening enters said mixing tube bore at an included angle Ø which is in the range of about 60° to about 90°.

* * * * *